US008498948B2

(12) United States Patent
Huang et al.

(10) Patent No.: US 8,498,948 B2
(45) Date of Patent: Jul. 30, 2013

(54) METHOD AND SYSTEM FOR ASSESSING DATA CLASSIFICATION QUALITY

(75) Inventors: Douglass Huang, Fairport, NY (US); Steven Paul Spiwak, Webster, NY (US); K. Bradley Paxton, Webster, NY (US)

(73) Assignee: ADI, LLC, Rochester, NY (US)

( * ) Notice: Subject to any disclaimer, the term of this patent is extended or adjusted under 35 U.S.C. 154(b) by 261 days.

(21) Appl. No.: 12/846,909

(22) Filed: Jul. 30, 2010

(65) Prior Publication Data

US 2012/0030151 A1 Feb. 2, 2012

(51) Int. Cl.
*G06F 15/18* (2006.01)
*G06N 5/02* (2006.01)
(52) U.S. Cl.
USPC ............................... 706/12; 706/54; 382/187
(58) Field of Classification Search
USPC ...................................... 706/12, 54; 382/187
See application file for complete search history.

(56) References Cited

U.S. PATENT DOCUMENTS

| | | | |
|---|---|---|---|
| 5,805,747 A | 9/1998 | Bradford | |
| 6,295,387 B1* | 9/2001 | Burch | 382/311 |
| 6,820,089 B2* | 11/2004 | Vishnubhotla | 1/1 |
| 2006/0045344 A1* | 3/2006 | Paxton et al. | 382/187 |
| 2008/0219557 A1* | 9/2008 | Dawson et al. | 382/187 |
| 2008/0221977 A1* | 9/2008 | Dawson et al. | 705/11 |
| 2008/0235263 A1* | 9/2008 | Riaz et al. | 707/102 |

OTHER PUBLICATIONS

Smith P et al., "A Comprehensive View of Capture Data Quality", Lockheed Martin, 2007.*
Paxton K et al., "Testing Production Data Capture Quality", FCSM Conference, pp. 1-9, 2012.*
Paxton K et al., "Truthing Production Data Capture", JSM, Washington D.C., Aug. 4, 2009.*
Dengel et al: Techniques for Improving OCR Results Handbook of Character Recognition and Document Image Analysis (pp. 227-258) (Chapter 8) © 1997 by World Scientific Publishing Company.
Macià et al: Genetic-Based Synthetic Data Sets for the Analysis of Classifiers Behavior (pp. 507-512) Eighth International Conference on Hybrid Intelligent Systems IEEE Computer Society.
Jeske et al: Synthetic Data Generation Capabilties for Testing Data Mining Tools (pp. 1-6).
Lin et al: Development of a Synthetic Data Set Generator for Building and Testing Information Discovery Systems (6 pages)—IEEE Computer Society.

* cited by examiner

*Primary Examiner* — Jeffrey A Gaffin
*Assistant Examiner* — Dave Misir
(74) *Attorney, Agent, or Firm* — Brian B. Shaw, Esq.; Thomas B. Ryan; Harter Secrest & Emery LLP (57) ABSTRACT

Production data classified from a data source, such as a plurality of handprinted forms, is compared to provisional truth data independently classified from the same data source for constructing master truth data. The production data is compared to the master truth data for evaluating the quality with which the production data was classified.

13 Claims, 4 Drawing Sheets

METHOD AND SYSTEM FOR ASSESSING DATA CLASSIFICATION QUALITY

STATEMENT REGARDING FEDERALLY SPONSORED RESEARCH OR DEVELOPMENT

The U.S. Government has a paid-up license in this invention and the right in limited circumstances to require the patent owner to license others on reasonable terms as provided for by the terms of (Contract No. 50-YABC-2-66044) awarded by the United States Census Bureau.

TECHNICAL FIELD

The invention relates to the construction of operatively defined "truth" data originating from a common data source intended for processing as captured or otherwise classified production data and to the evaluation of the production data, particularly with respect to the accuracy with which the production data is classified, by comparison to the operatively defined "truth" data.

BACKGROUND OF THE INVENTION

For evaluating the performance of production forms data capture systems, it has been customary to have human data entry personnel, referred to as "keyers", sample original captured data fields according to prescribed protocols for determining the correct answers (i.e., "truth") of production data. For example, the "truth" of the production data can be operatively determined to a desired statistical accuracy by having "keyers" verify (i.e., "double key") each others answers. The time and effort required for evaluating the "truth" of large quantities of production data to desired statistical accuracy can be prohibitively expensive, resulting in compromises among the amount of production data evaluated and the accuracy with which the production data is evaluated.

As a goal set among certain embodiments of the invention, software automation and good statistical design is used to reduce the human effort by as much as 40 times while obtaining high quality "truth" for evaluating production data to desired statistical accuracy. Once the "truth" of the production data is known, the production data can be scored using a variety of correctness criteria appropriate for the application, including categorical groupings of "hard match" (i.e., exact) comparisons and "soft match" (i.e., approximate) comparisons of related meanings.

SUMMARY OF THE INVENTION

The invention among its preferred embodiments evaluates production data sets against master truth data sets that are constructed in part by comparing the production data sets, which are drawn from data sources according to a first protocol, against provisional truth data sets, which are drawn from the same data sources according to a second protocol. The first and second protocols differ in one or more ways that allow the derived data sets (i.e., the production data set and the provisional truth data set) to be treated as being effectively statistically independent.

For constructing the master truth data sets in the preferred embodiments, the production data sets and the provisional truth data sets are compared on a data field-by-data field basis. Any matches between corresponding data fields are deemed "true", and the corresponding data fields are added to the records of the master truth data set. Any mismatches are compared to the original in the data source from which both data fields are drawn to determine whether the production data field (PDF) or the provisional truth data field (PTF) matches the original in the data source. If either data field is found to match the original in the data source, the matching data field is added to the appropriate record in the master truth data set. If neither data field is found to match the original in the data source, an alternative value can be drawn from the original in the data source and, with appropriate safeguards, added to the master truth data set. "Ambiguous" or "inconclusive" data fields are preferably flagged in the master truth data set so that the "ambiguous" or "inconclusive" data fields can be accounted for within subsequent statistical analyses but can be excluded from certain scoring evaluations, such as error rate measurements.

Both the production data sets and the provisional truth data sets can be constructed at least in part by automated processing of the data sources. For example, the contents of fields within a set of completed forms comprising the data source can often be interpreted by optical character recognitions systems (OCR systems) or by optical mark recognition systems (OMR systems). The remaining fields within the individual forms whose contents cannot be ascertained on an automated basis to a desired level of confidence can generally be discerned manually or in some other fashion. Since the provisional truth data sets can be constructed largely in an automated fashion, and, as a component cost in the construction of the master truth data sets, which themselves can also be largely constructed by making automated comparisons, the cost of constructing the master truth data sets is significantly reduced while the speed and accuracy with which the master truth data sets are constructed is significantly increased.

The provisional truth data sets and the production data sets that contribute to constructing the master truth data sets are constructed from the same source data (e.g., the set of forms in paper or electronic images of the forms) but are constructed according to different protocols. For example, if the OCR system that interprets the contents of the source data for constructing the production data set interprets form fields on a character-by-character basis, the OCR system that interprets the contents of the same data source for constructing the provisional truth data set can interpret the form fields on a word-by-word or other basis. Generally, proprietary OCR systems from different vendors are expected to be sufficiently different to support the assumption of statistical independence, such that instances in which both OCR systems arrive at the same wrong meaning ("truth") are rare. On the other hand, most of the data fields in the production data set and the provisional truth data set are expected to match because the error rates in each of the production data set and the provisional truth data set are expected to be low. Just the mismatches between the production data set and the provisional truth data set are subject to additional processing for completing the master truth data set, and most likely, the mismatched data fields of one or the other of the production data set or the provisional truth data set match the source data for appending additional data fields to the master truth data set. Among the few instances in which neither the data field from the production data set nor the corresponding data field from the provisional truth data set matches the original of the data source, human analysts or another data interpretation system can be used to recapture the data source to a level of confidence that allows the recaptured data fields to be added to the master truth data set. Failing that, "ambiguous" or "inconclusive" data can be identified as such in the master truth data set so that data fields within the production data set with unknown or uncertain truth are noted but not subject to the same evaluation.

Although in the examples given the production data sets are compared to the provisional truth data sets, these comparisons are not used for evaluating the production data sets. Instead, the comparisons between the production data sets and the provisional truth data sets are used in the construction of the master truth data sets. At least some of the discrepancies between the production data sets and the provisional truth data sets can be resolved by reference to the common data source. The master truth data sets provide a basis for evaluating the accuracy of corresponding data fields within both the production data set and the provisional truth data set, although the production data set is generally the ultimate target of the evaluation.

While the accuracy of the provisional truth data set is preferably as high as reasonably possible, the accuracy of the provisional truth data set can be higher than or lower than the accuracy of the production data set, such as measured against the same master truth data set. Given a higher independence, a lower accuracy of the provisional truth data set can be statistically accommodated. However, higher accuracy coupled with independence of the provisional truth data set allows for construction of the master truth data set on a more automated basis.

Comparisons between the production data set and the master truth data set can be used to assess not only the overall accuracy of the production data set, but also the accuracy of components within the production data set. For example, fields within the individual forms can be organized into records with each record corresponding to another instance of the same form. Thus, particular error rates can be linked to individual fields or field types within data forms. Preferably, both the production data set and the master truth data set share the same file structure, although metadata associated with the data fields or records can also be used to more explicitly identify, describe, and associate the different data fields or records among the data sets.

DETAILED DESCRIPTION OF THE INVENTION

Figure 1:
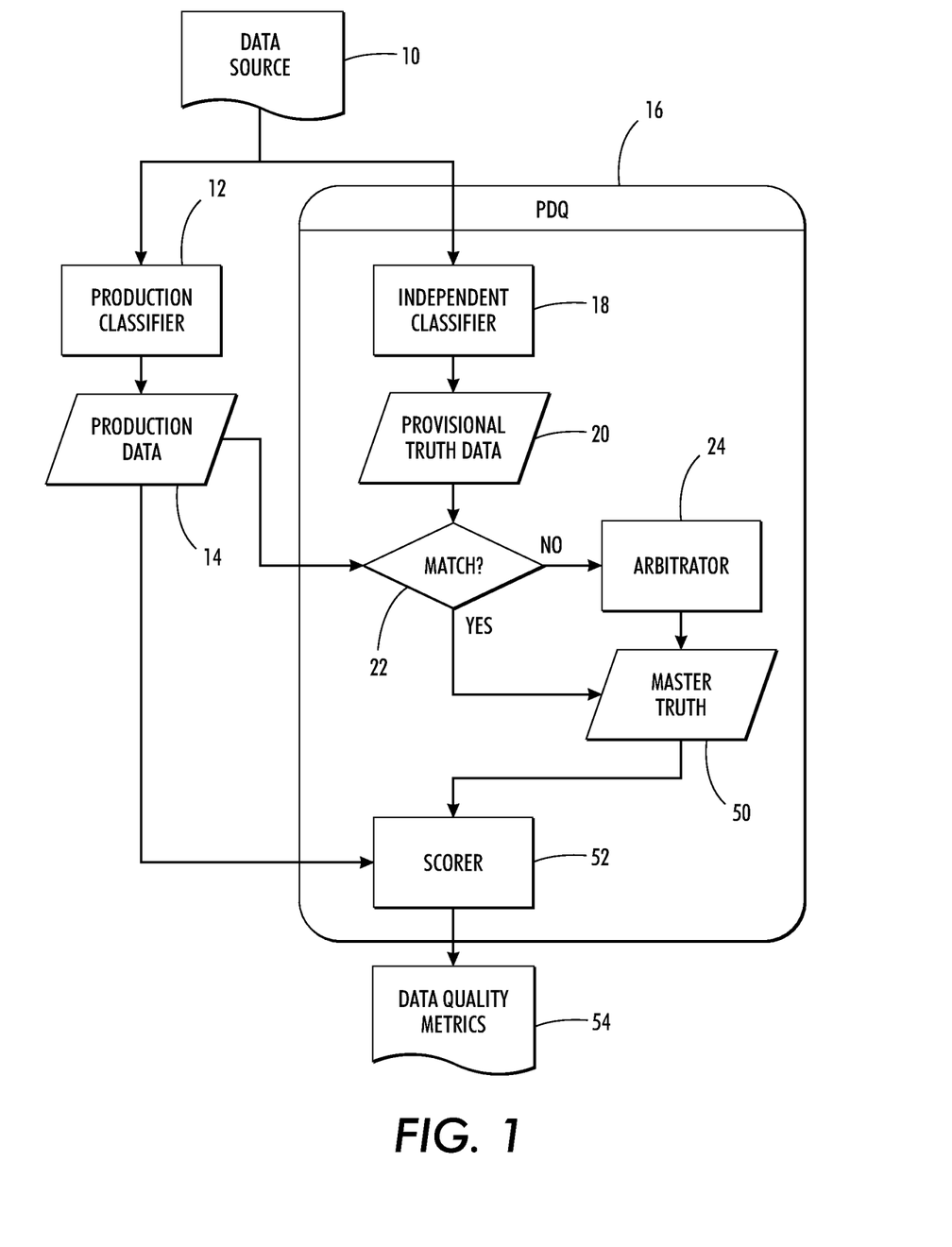
FIG. 1 is a flowchart depicting the integration of a Production Data Quality (PDQ) tool with production data for evaluating the production data.

The flowchart presented in FIG. 1 depicts a two-stage comparison of production data within a Production Data Quality tool for evaluating production data in accordance with a preferred embodiment of the invention. A data source 10, which contains data intended for capture and subsequent processing, can take a number of forms including handprinted sheets or electronic scans of the handprinted sheets. Typically, the handprinted sheets begin as a set of identical forms (single or multi-page forms) with designated fields laid out on the forms for receiving handprinted answers to prepared questions or other requests for information.

A production classifier 12 executes a set of instructions stored within a computer readable medium for accessing the data source 10, interpreting the handprinted fields of the source data 10, and writing the interpretations to a production data set 14 as a collection of computer readable data fields. Since the same handprinted fields are accessed from each handprinted form, the data fields are preferably organized into records with each record containing the data fields derived from a single form. The interpretations are generally made by automated means, such as by a conventional optical character recognition system (OCR system) for recognizing alphanumeric text or an optical mark recognition system (OMR system) for recognizing check boxes, fillable dots, or other binary inputs. If meaningful, internally consistent interpretations of the handprinted data cannot be made by automated means, human keyers can be organized to interpret and record the remaining data fields within the production data set.

The quality with which the source data 10 is captured within the production data set 14 is important to assess for determining the statistical accuracy with which the data can be interpreted and for making improvements to the collection and capture of the handprinted data. As a part of a Production Data Quality (PDQ) tool designated at 16, an independent classifier 18 accesses the same data source 10 for deriving meaningful output in the form of data fields that are similarly organized by form into a succession of records within a provisional truth data set 20. Similar to the production classifier 12, the independent classifier 18 executes a set of instructions stored within a computer readable medium for accessing the data source 10 and interpreting the handprinted fields of the source data 10. The interpretations of the handprinted fields are written to a provisional truth data set 20 as a collection of computer readable data fields. The provisional truth data set 20 can be organized in different ways, including by grouping the data fields into records or by assigning metadata for linking the data fields or even characters within the data fields to the fields and forms from which the data is extracted. Similar to the production classifier 12, the source data 10 accessed by the independent classifier 18 can be the original handprinted forms or electronic images of the handprinted forms.

Also similar to the to the production classifier 12, the independent classifier 18 preferably interprets the handprinted data whenever possible by automated means, such as by a conventional optical character recognition system (OCR system) or an optical mark recognition system (OMR system). However, the automated means for interpreting data within the independent classifier 18 differs from the automated means for interpreting data within the production classifier 12. Preferably the difference is enough to support a statistical independence between the results of the two automated means. A differently arranged manual keying system or at least different human keyers are used by the independent classifier 18 to capture meaningful data from the handprinted forms that cannot be resolved by automated means to a desired level of confidence.

Overall, the production classifier 12 and the independent classifier 18 are understood to operate under different protocols for supporting a statistical independence such that instances in which the production classifier 12 and independent classifier 18 yield the same "wrong" result are rare. Most manufactures of OCR and OMR systems employ proprietary pattern recognition and artificial intelligence systems that differ from one another. For example, some such OCR systems segment handwritten fields into characters and assemble likely words from the character combinations. Other such OCR systems find likely word matches directly from handprinted samples.

In the relatively small percentage of instances in which the automated handprint recognition systems yield wrong answers as opposed to mere failures to interpret handprinted text to a desired level of confidence, the use of different automated handprint recognition systems further limits the percentage of instances in which both recognition systems yield the same "wrong" answer.

Both the production classifier 12 and the independent classifier 18 also provide manual or other less automated means for interpreting handprinted text or marks that are not recognizable by the automated handprint recognition systems. These generally involve manual keying of the handprinted text or marks by human keyers trained in the recognition of handprint. For assuring accuracy, the same text or marks can be independently keyed by one or more other human keyers under the same or different conditions. Various training systems and operating procedures have been developed for achieving acceptable levels of accuracy. Preferably, the protocol under which the independent classifier 18 operates includes systematic differences from the production classifier 12 in the treatment of handprinted text that is not recognized by the automated system. Where human keyers are involved, this preferably includes using different keyers to manually interpret handprinted text or marks within the independent classifier 18 from the keyers used to manually interpret handprinted text or marks for the production classifier 12.

A comparator 22, which can be implemented by the execution of computer code having automated access to both the production data set 14 and the provisional truth data set 20 (such as arranged in a relational data base), the interpreted data fields in the production data set 14 are compared to the interpreted data fields in the provisional truth data set 20, preferably according to a "hard match" (i.e., exact) criterion. That is, the interpreted text or marks between the two data sets 14 and 20 are deemed to match only if the interpreted text or marks match exactly, and if any differences are found, the affected data fields from the two data sets 14 and 20 are entered into an arbitrator 24. Any corresponding data fields found to "hard match" are deemed "true" and the "true" matches are written into a master truth data set 50.

Figure 2:
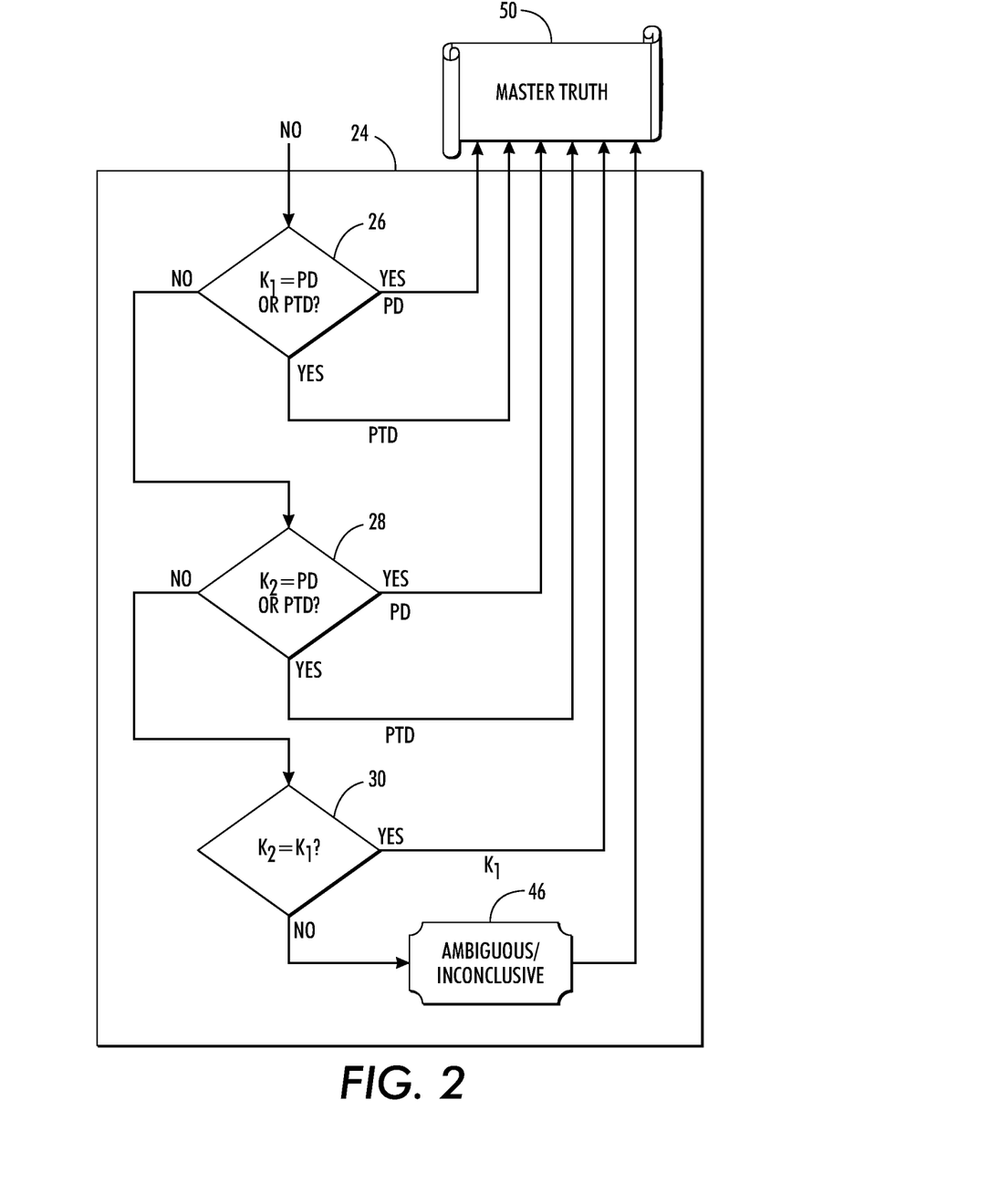
FIG. 2 is a logical flowchart of a "truth scrubber" routine within the PDQ tool for manually comparing original source data to possible choices.

FIG. 2 presents a flow chart depicting logic governing exemplary procedures within the arbitrator 24, also referred to as a "truth scrubber". Within an essentially three-step decision process, referenced as steps 26, 28, and 30, one or more analysts (trained personnel in the recognition of handprint) are presented with options for considering whether either of the mismatched interpretations held, for example, by the production data set 14 or the provisional truth data set 20 corresponds to the original handprinted field of the source data 10 or whether a better interpretation can be made. All three decision steps 26, 28, and 30 can be written and carried out with the assistance of a computer executable code implemented through one or more graphical user interfaces for presenting options to the analysts and capturing selections or other entries made by the analysts. The captured selections or other entries made by the analysts, although ultimately recorded to the master truth data set 50, are also available when necessary at the successive decision steps 28 and 30 within the arbitrator 24.

Figure 3:
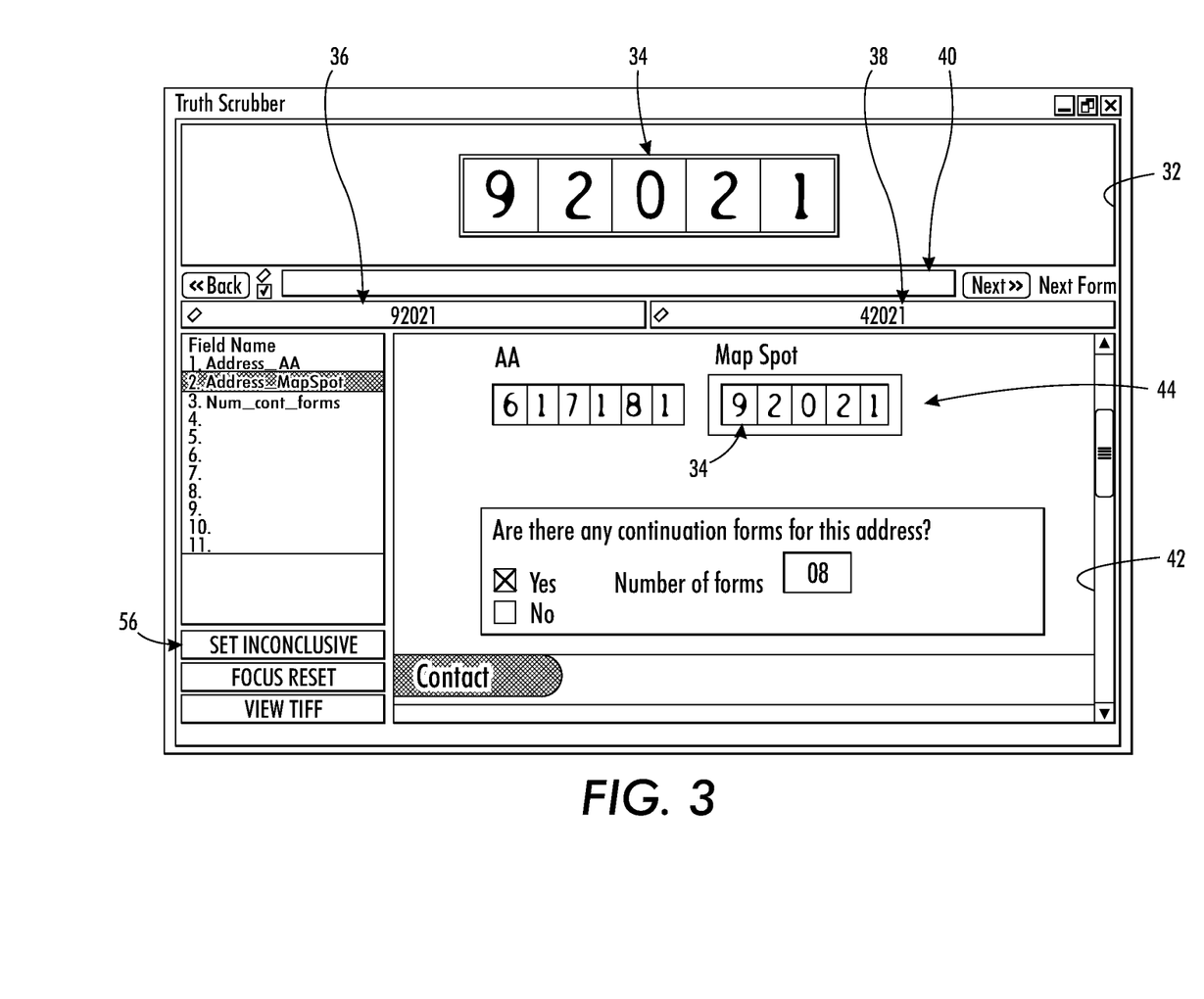
FIG. 3 is a screen shot showing an analyst's view of the original source data and possible choices for reconciling character classifier outputs within the "truth scrubber" routine.

FIG. 3 contains a screen shot as might appear on an analyst's monitor within the graphical user interface. Centered within a window 32 at the top of the screen is a field snippet 34 imaged directly or indirectly from the data source 10. Choice buttons 36 and 38 present the mismatched interpretations of the same field snippet 34 by the production classifier 12 and the independent classifier 18. Preferably, the contents of the choice buttons 36 and 38 are presented in an arbitrary or otherwise random order between the production data set 14 and the provisional truth data set 20 to reduce the chances of introducing a systematic error. Mouse, keyboard, voice commands, or other known inputs can be used for choosing between the two options. An answer input text box 40 accepts input from the analyst for entering an independent interpretation of the field snippet 34. Keyboard, voice recognition, or other known inputs can be used for entering the independent interpretation into the answer input text box 40. The field snippet 34 also appears highlighted within a window 42 together with a scrollable image 44 of the form from which the field snippet 34 is drawn. The form image 44, which can be scrolled within the window 42, reveals the remaining contents of the form to provide the analyst with an enlarged context within which to assess the contents of the field snippet 34.

For executing step 26, a first analyst is presented with an image of the field snippet 34 and the ability to choose among the two mismatched interpretations (the choice buttons 36 and 38) or to provide a perceived better interpretation (the answer input text box 40) equating to the variable $K_1$. If the first analyst assigns to $K_1$ either of the two mismatched interpretations from the production data set 14 or the provisional truth data set 20 (i.e., selects choice button 36 or 38), the $K_1$ assignment is designated as a "truth" and marked for writing into the master truth data set 50. If the first analyst assigns to $K_1$ a perceived better interpretation (i.e., enters text into the answer input text box 40), a second analyst is presented with a similar set of choices reflected by the combined possibilities of decision steps 28 and 30. That is, the second analyst can be presented with an image of the field snippet 34 and the ability to choose among the two mismatched interpretations of the field snippet 34 from the production data set 14 and the provisional truth data set 20 (the choice buttons 36 and 38) or to provide a perceived better interpretation (the answer input text box 40) equating to the variable $K_2$. If the second analyst assigns to $K_2$ either of the two mismatched interpretations from the production data set 14 or the provisional truth data set 20 (i.e., selects choice button 36 or 38), the $K_2$ assignment is designated as a "truth" and marked for writing into the master truth data set 50. If the second analyst assigns to $K_2$ a perceived better interpretation (i.e., enters text into the answer input text box 40), the $K_2$ assignment is compared to the $K_1$ assignment, and if the two assignments $K_1$ and $K_2$ match, the matching assignment is designated as a "truth" and marked for writing into the master truth data set 50. On the other hand, if the two assignments $K_1$ and $K_2$ do not match, no interpretation is designated as "truth" and the data field is instead designated as "ambiguous" and processed through step 46 to flag its status in the master truth data set 50.

As a practical matter, none of the data fields belonging to an individual form are preferably written into the master truth data set 50 unless and until all of the data fields within the form have been interpreted. Fields with "ambiguous" or "inconclusive" results processed through step 46 are identified as such in the master truth data set 50.

Figure 4:
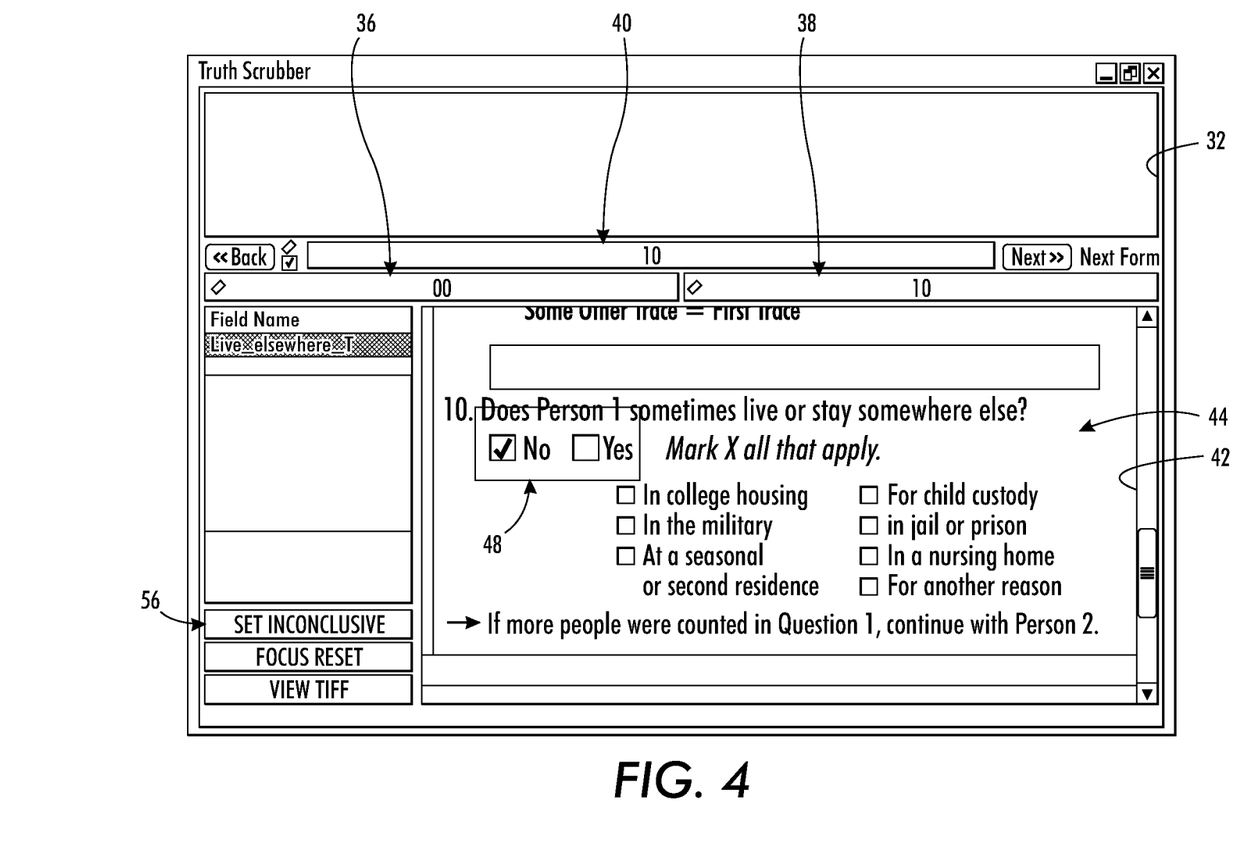
FIG. 4 is a screen shot showing an analyst's view of the original source data and possible choices for reconciling mark classifier outputs within the "truth scrubber" routine.

FIG. 4 contains a screen shot as might appear on an analyst's monitor within the graphical user interface in connection with the interpretation of a binary field type snippet 48 highlighted within the window 42 together with the scrollable image 44 of the form from which the field snippet 48 is drawn. The binary field type snippet 48 is preferably captured by the production classifier 12 or the independent classifier 18 using an automated OMR system. Within the choice buttons 36 and 38 and the answer input text box 40, the binary field snippets are encoded with a "1" indicating the presence of a check or valid mark within a check box and a "0" indicating the absence of a check or other valid mark within another check box of the same snippet. For the illustrated snippet 48, the choice button 38 holds the correct answer "10", and the answer text box 40 holds the selected answer "10", which corresponds to the correct answer.

As also apparent in FIGS. 3 and 4, the analyst also has the option of explicitly designating the contents of the field snippets 34 or 48 as "inconclusive" via the "SET Inconclusive" button 56 shown in the screenshots. The selection assigns to the variable $K_1$ or $K_2$ a uniquely coded value representing the field status "inconclusive". If the $K_1$ assignment from the first analyst is "inconclusive", the field will be presented to a second analyst, who can also choose to designate the contents of the field as "inconclusive". This results in a special case of $K_2=K_1$, in which the truth value is "inconclusive". These fields are appropriately flagged in the master truth data set for exclusion from error rate measurements in the scoring process. If the second analyst chooses instead to assign a new interpretation to the field previously designated as "inconclusive", the values in $K_1$ and $K_2$ do not match and the field is designated as "ambiguous" and flagged as such in the master data set. The "inconclusive" designation can also be applied by keyers classifying data fields in the production data set or the provisional truth data set. A similar "inconclusive" designation by the first or second analyst would also result in an "inconclusive" designation value that is similarly flagged within the master truth data set.

For saving time, the second analyst could be presented with the $K_1$ assignment of the first analyst as a selectable choice (e.g., a choice button) in addition to or as a replacement for the selectable choices between the production data set 14 and the provisional truth data set 20. If either the production data set 14 or the provisional truth data set 20 has a higher probability of correctness, interpretations from the more reliable data set can be paired with the $K_1$ assignment as a first level choice for the second analyst. A second level choice can be made as to whether corresponding field data from the less reliable data set matches the field snippets 34 and 48. The second analyst may also proffer a perceived better interpretation, in which case the data field is designated as "ambiguous".

Returning to FIG. 1, once the master truth data set 50 has been completed, a second comparison is made with the production data set 14 within a scorer 52, which can also be implemented in computer executable code having automated access to both the production data set 14 and the master truth data set 50. The second comparison excludes the contents of data fields with results designated as "ambiguous" or "inconclusive" as processed through step 46. Preferably, the scoring is automated according to a "hard match" criterion such that contents of corresponding data fields in the production data set 14 and the master truth data set 50 exactly match or they do not. Tallies of the number of errors over the number of fields considered can be segregated between individual fields or field types or delineated in other meaningful ways for discovering trends or other possible sources of error. For example, the errors within each data field can be evaluated on a position-by-position basis within the data field or errors over the entire data set can be evaluated on a character-by-character basis. The scores and information supporting the scores are output from the Production Data Quality tool 16 as data quality metrics 54 for evaluating the quality of the data within the production data set 14. Additional levels of analysis, including "soft match" criteria can be used in scoring to evaluate degrees of meaning or implied issues of intent. The data quality metrics 54 are preferably used to make improvements to the acquisition or presentation of the source data or its classification by the production classifier 12. A similar scoring system can be used for evaluating the quality of the provisional truth data set 20 and make improvements to the independent classifier 18 as well.

A statistical basis for the construction of the master truth data set 50 in part as a comparison with the production data set 14 and for the evaluation of the production data set 14 using the master truth data set 50 is developed below with the aid of reasonably simple probability equations to describe how the (millions) of handprinted fields will move through Production Data Quality tool 16. A key assumption in this analysis is that the various independently derived data sets, e.g., the production data set and the provisional truth data set, are independent random variables (see, for example, Parzen, Emanuel, *Modern Probability Theory and Its Applications*, Wiley & Sons, New York, 1960).

Given such assumptions, two independent events A and B can be defined on the same probability space, the probability of both A and B occurring as P[AB]=P[A]P[B]. Two basic field error rates, $E_{pd}$ for the production data set error rate and $E_{pt}$ for the provisional truth data set error rate, are defined. Using these definitions two basic equations can be written describing the probabilities relating to a "hard match" between corresponding data fields in the production data set 14 and the provisional truth data set 20 as follows:

$$P_h = (1-E_{pd})(1-E_{pt}) \quad (1)$$

$$Q_h = E_{pd} + E_{pt}(1-E_{pd}) \quad (2)$$

where $P_h$ is the probability of a "hard match" and $Q_h$ is the remaining probability of a lack of a "hard match."

The probability $Q_h$ of a lack of a "hard match" encompasses a sum of the various probabilities considered within the arbitrator 24 as follows:

$$P[K_1=PDF]=(1-E_1)(1-E_{pd})E_{pt} \quad (3)$$

$$P[K_1=PTF]=(1-E_1)(1-E_{pt})E_{pd} \quad (4)$$

$$P[K_2=PDF]=E_1 E_{pt}(1-E_2)(1-E_{pd}) \quad (5)$$

$$P[K_2=PTF]=E_1 E_{pd}(1-E_2)(1-E_{pt}) \quad (6)$$

$$P[K_2=K_1]=E_p E_{pd}(1-E_2)(1-E_1) \quad (7)$$

along with the probability of an "ambiguous" or "inconclusive" outcome as $$P[I]=E_1 E_2 (E_{pd}+E_{pt})+E_{pd}E_{pt}(E_1+E_2)-3E_1 E_2 E_{pd} E_{pt} \quad (8)$$

where $K_1$ and $K_2$ are the selections made by the first and second analysts, PDF is the value of a production data field within the production data set 14, PTF is the value of the corresponding provisional truth data field within the provisional truth data set 20, and $E_1$ and $E_2$ are the error rates for the first and second analysts.

Given that the error rates $E_{pd}$ and $E_{pt}$ are expected to be very low, the probability $P_h$ that the data fields in the production data set 14 and the provisional truth data set 20 match is quite high and close to one. Among the diminished remaining probability ($Q_h$) of a lack of match, the chances are good that the $K_1$ choice of the first analyst corresponds to one or the other of the data fields PDF or PTF in the production data set 14 and the provisional truth data set 20. Thus, the outcomes $P[K_1=PDF]$ and $P[K_1=PTF]$ are of the order of $Q_h$ or E. The further reduced probability that the second analyst contributes something useful to the "Truth" of the master truth data set 50 through any of the three outcomes $P[K_2=PDF]$, P[$K_2$=PTF], or P[$K_1$=$K_2$] is of a second order $E^2$. Finally, the remaining probability P[I] of what is not considered "Truth" and is classified as "ambiguous" or "inconclusive" is of a third order $E^3$.

A set of source data 10 consisting of 333,262 alphabetic write-in fields was processed with both the production classifier 12 and the independent classifier 18. The provisional truth data set 20 was compared to the production data set 14 and it was found that 306,653 of the data fields "hard matched" (92.02%) and were sent directly to the master truth data set 50 and 26,609 data fields did not "hard match" (7.98%), and were sent to the arbitrator 24 (see FIG. 1).

Upon scoring the production data set 14 and the provisional truth data set 20 against the master truth data set 50, it was found that the number of data fields in error within the production data set 14 was 7,376 and the number of data fields in error within the provisional truth data set 20 was 19,718. Of the 333,262 production data fields (PDF) processed only 51 data fields were characterized as "ambiguous" or "inconclusive" at the end of the PDQ process, so the proper denominator for computing error rates is 333,262−51=333,211. Derived from this data, the error rates for the provisional truth data set $E_{pt}$ and the $E_{pd}$ are given as follows:

$$Ept = 19{,}718/333{,}211 = 0.0591757 \quad (9)$$

$$Epd = 7{,}376/333{,}211 = 0.0221361 \quad (10)$$

Having derived these error rates $E_{pt}$ and $E_{pd}$ and by substituting values into Equations (1) and (2), the two probabilities of matching or not matching are given as:

$$P_h = (1-0.0221361)(1-0.0591757)$$
$$= 0.9199981 = 92.00\%$$

$$Q_h = 0.0221361 + 0.0591757(1-0.0221361)$$
$$= 0.0800018 = 8.00\%$$

Thus, the theory as expressed by Equations 1 & 2 agreed with the actual data to within 0.02%. This strong agreement suggests that the assumed independence between the production data set 14 and the provisional truth data set 20 was justified. Both of these data sets 14 and 20 were produced largely by computer automation with only modest human keying assistance.

Of the 26,609 data fields processed by the arbitrator 24 the first analyst set $K_1$ equal to the presented PDF fields on 18,905 occasions and set $K_1$ equal to the presented PTF fields on 6,395 occasions. The second analyst set $K_2$ equal to the presented PDF fields on 136 occasions, set $K_2$ equal to the presented PTF fields on 29 occasions, and set $K_2$ equal to $K_1$ on 1093 occasions. As mentioned earlier, only 51 data fields were left as ambiguous" or "inconclusive".

Using the above data, a table of theory vs. data can be constructed as follows:

| Probability | Theory | Data | Data-Theory |
| --- | --- | --- | --- |
| $P_h$ | 92.00% | 92.02% | 0.02% |
| P[$K_1$ = PDF] | 5.67% | 5.67% | 0.01% |
| P[$K_1$ = PTF] | 2.04% | 1.92% | −0.12% |
| P[$K_2$ = PDF] | 0.12% | 0.04% | −0.08% |
| P[$K_2$ = PTF] | 0.04% | 0.01% | −0.03% |
| P[$K_2$ = $K_1$] | 0.13% | 0.33% | 0.20% |
| P[I] | 0.00% | 0.02% | 0.01% |
| Total | 100.00% | 100.00% | 0.00% |

The table shows good agreement between the math model and the actual data processed in accordance with the invention. The high productivity of PDQ tool 16 arises in large measure from the fact that 92% of the data is processed in an at least semi-automated fashion, while an additional 7.6% of the data is processed by the first analyst, so that only 0.4% of the data remains to be handled by the second analyst.

The largest departure between theory and data concerns the instances in which the independent interpretations of the two analysts agree, i.e., where $K_1$=$K_2$. In particular, the data shows 0.2% more agreement between the two analysts than predicted by the model. This might be attributed to instances in which difficult inputs resulted in different errors in the two classifiers' outputs, which were resolved correctly by the two analysts, or in which both analysts may have disobeyed the same rule for handling an anticipated situation.

Although the above examples provide specifically for evaluating the capture of response data from structured paper forms, the above-described data evaluation systems can be arranged for evaluating other sorts of data classifications, such as for evaluating unstructured forms or for matching data between different lists or other data records. For example, the accuracy with which personal data (e.g., medical records) from different sources can be matched to the same underlying person can be evaluated according to similar rules based on combining a production data classification with an independent provisional data classification to obtain a master data classification and comparing the production data classification to the master data classification for scoring the production data.

The invention claimed is:

1. A method of evaluating production data classified from a data source comprising steps of constructing provisional truth data by classifying data from the data source independently of the production data with an automatic recognition system, constructing master truth data by equating the production data to the provisional truth data and resolving discrepancies with reference to the data source, the step of constructing the master truth data including:

incorporating into the master truth data contents from corresponding data fields in the production data and the provisional truth data that match, presenting an image of the source data together with contents from corresponding data fields in the production data and the provisional truth data that do not match each other to a first analyst for visual comparison of the source data to the contents of each of the corresponding data fields in the production data and the provisional truth data, the first analyst performing either:

(i) selecting between the contents of the corresponding data fields in the production data and the provisional truth data as a match to the imaged source data based on the visual comparison for appending the selected contents to the master truth data, or (ii) assigning a first interpretation of the image of the source data, presenting the image of the source data together with contents from corresponding data fields in the production data and the provisional truth data that do not match each other or the selection of the first analyst to a second analyst for visual comparison of the source data to the contents of each of the corresponding data fields in the production data and the provisional truth data, the second analyst performing either:

(i) selecting between the contents of the corresponding data fields in the production data and the provisional truth data as a match to the imaged source data based on the visual comparison for appending the selected contents to the master truth data, or (ii) assigning a second interpretation of the image of the source data, comparing the first and second interpretations of the image of the source data for adding matching interpretations of the image of the source data to the master truth data, and scoring the production data by comparing the production data to the master truth data.

2. The method of claim 1 in which the step of comparing the first and second interpretations includes flagging a corresponding field in the master truth data as inconclusive when the first and second interpretations do not match.

3. The method of claim 2 in which the step of scoring the production data includes excluding the flagged fields of the master truth data from the scoring of corresponding fields of the production data.

4. The method of claim 1 in which the production data is classified from the data source according to a first protocol and the step of constructing the provisional truth data includes classifying the data from the data source according to a second protocol that differs from the first protocol.

5. The method of claim 4 in which the first and second protocols differ in one or more ways that allows the production data and the provisional truth data to be effectively statistically independent.

6. The method of claim 1 in which the data source is based on a plurality of forms having handwritten fields commonly arranged within the forms.

7. A system for scoring the quality of production data classified from a common data source comprising an independent classifier for classifying provisional truth data independently of the production data from the common data source, a comparator for comparing corresponding data between the production data and the provisional truth data and assembling matching production and provisional truth data as master truth data, an arbitrator for separately comparing mismatched data between the production data and the provisional truth data to corresponding source data from the common data source and incorporating matching source and one of the production and provisional truth data into the master truth data, first and second graphical interfaces associated with the arbitrator for (a) presenting images of the source data together with content from corresponding fields of the mismatched data between the production data and the provisional truth data to first and second analysts and (b) inputting selections of the first and second analysts between the mismatched production and provisional truth data as matches to the imaged source data and interpretations of the imaged source data by the first and second analysts in place of one or more of the selections, the arbitrator being arranged for (a) appending the first analyst's selections between the mismatched selected data to corresponding fields of the master truth data, (b) appending the second analyst's selections between the mismatched selected data to corresponding fields of the master truth data if the first analyst inputs an interpretation, and (c) appending the first analyst's interpretation to corresponding fields of the master truth data if the second analyst's interpretation matches the first analyst's interpretation, and a scorer for comparing the production data against the master truth data.

8. The system of claim 7 in which the production data is classified from the common data source according to a first protocol and the independent classifier operates according to a second protocol for classifying the data from the common data source, wherein the first and second protocols differ to provide a statistical independence between the production data and the provisional truth data.

9. The system of claim 7 in which the arbitrator is also arranged for flagging corresponding fields in the master truth data when the first and second interpretations do not match.

10. The system of claim 9 in which the scorer is arranged for excluding the flagged fields of the master truth data from the scoring of corresponding fields of the production data.

11. The system of claim 7 in which the common data source includes a set forms having corresponding form fields that are identifiable within both the production data and master truth data.

12. The system of claim 11 in which the scorer is arranged for tallying scoring of individual form fields.

13. The system of claim 7 in which the common data source is based on a plurality of handprinted forms.

* * * * *